Patented Dec. 20, 1949

2,491,865

UNITED STATES PATENT OFFICE 2,491,865

PROCESS OF PREPARING LUMINESCENT MAGNESIUM TITANATE

Ferdinand Anne Kröger and Jan Broos, Eindhoven, Netherlands, assignors to General Electric Company, Schenectady, N. Y.

No Drawing. Application July 23, 1946, Serial No. 685,764. In the Netherlands May 5, 1944

7 Claims. (Cl. 252—301.4)

This invention relates to a process of preparing luminescent magnesium titanate containing manganese and to a source of rays constituted by the combination of a discharge tube and a magnesium titanate prepared by this process.

It is known to prepare a luminescent material by heating a mixture of magnesium oxide and titanium oxide, or compounds from which these substances may be obtained, a small quantity of manganese being added to serve as the activator. From this heating ensues a magnesium titanate containing manganese. In methods which are common practice for the preparation of a luminescent material the reaction product is cooled down to room temperature and finely pulverised, whereafter the substance is ready for use. Now, it was described that the manner and the atmosphere in which the cooling process of the magnesium titanate is effected influences the output of light of the luminescent material on being radiated, for example, by longwave ultraviolet rays. Thus, it is mentioned that the brightness of the fluorescence is materially improved by cooling down slowly in the furnace in which the titanate has been prepared. It is stated, in addition, that the luminescence of the preparation containing manganese is fully neutralised by reducing in an atmosphere of nitrogen whereas annealing in an atmosphere of oxygen gives highly satisfactory results.

The invention is based on the recognition of the fact that the prolonged cooling process is not necessary since the good luminescent properties of the magnesium titanate are obtained in only a limited range of temperatures.

According to the invention, the magnesium titanate containing manganese is subjected to a special treatment which consists in heating the said substance at a temperature of from 400 to 600° C. for 10 to 20 hours in an oxidising atmosphere.

As a result of this heating process the magnesium titanate is rendered highly luminescent, it being immaterial at what moment this heating process is effected. It is possible, for example, first to prepare the magnesium titanate by heating titanium oxide and magnesium oxide with manganese as the activator and to cool down rapidly (to chill) the reaction product thus obtained so that it attains room temperature and, subsequently, to render the substance thus prepared, which exhibits substantially no luminescence, highly luminescent by the heating process according to the invention. This heating process may take place either at once, or only after the substance has been stored for a shorter or a longer period of time.

It is also possible for the reaction product, obtained by the heating of titanium oxide and magnesium oxide with manganese as the activator, or of their compounds, for example of nitrates from which the said oxides may be obtained by heating, to be cooled down rapidly to a temperature of about 600° C., subsequently maintained at a temperature of from 400 to 600° C. for 10 to 20 hours and then cooled down suddenly (chilled) to room temperature. In this case the process according to the invention is included in the method of preparation of the substance.

The required heating process is preferably effected at a temperature comprised between 500° and 580° C. since in this case the maximum output of light is obtained. The oxidising atmosphere required for the activation is, for example, oxygen or air.

The manganese-containing magnesium titanate which has been treated in accordance with the invention is red luminescent on being struck by rays of a wavelength comprised between 2650 and 4600 Å. The light which in this case is radiated by the titanate covers a narrow spectral region in the red having its maximum at a wavelength of about 6550 Å. As is well-known, there is a radiation between 4600 and 2650 Å. in a high-pressure mercury vapour discharge tube so that the titanate prepared by the process according to the invention may be used, for example in conjunction with such a discharge tube. For the excitation of the titanate the line having a wavelength of 3650 Å. is of special importance.

It has been found advantageous to carry out the process according to the invention in such manner that the ultimate luminescent product consists for the greater part of a magnesium orthotitanate.

The manganese content is comprised between 0.001 and 0.5 mol. per cent and preferably between 0.05 and 0.2 mol. per cent.

The luminescent material prepared by the method according to the invention may be used in conjunction with an electric discharge tube having a filling of mercury vapour, which tube may be of the so-called high-pressure type. However, other gaseous or vapour fillings may be used as well, for example rare gases, or vapour of zinc, cadmium, arsenic or mixtures thereof. The luminescent material may be applied in the form of a layer to the inside of the wall of the discharge tube. However, it is also possible to apply the luminescent layer to the wall of a tube which surrounds the discharge tube proper, or to a reflector located outside the discharge tube.

The invention will now be explained more fully by reference to one practical example describing the process of preparing a luminescent manganese-containing magnesium titanate according to the invention.

*Example*

80 grams of pure MgO are dissolved in parts in 660 ccm. of a purified hydrochloric solution of titanium containing 121.5 grs. of $TiO_2$ per liter. After the addition of 0.7 ccm. of a solution of manganese containing 200 gr. MnO per liter, the solution is made ammoniacal and dried up by vaporisation and the mass obtained is heated to about 500° C. for the purpose of expelling ammonium chloride. Subsequently, the temperature is gradually raised to weak glowing, during which operation chlorine is escaping. After the production of chlorine has ceased, the temperature is increased to 1200° C., at which temperature a heating process in air takes place for 1–2 hours. After being cooled down to room temperature, the mass obtained is ground to the size of grain suitable for coating a wall. Subsequently, the substance obtained is heated to 560° for 15 hours in an atmosphere of oxygen.

What we claim is:

1. The process of inducing a high degree of luminescence in a composition prepared by heat treatment at a temperature of about 1200° C. and consisting essentially of a magnesium orthotitanate actuated by .001 to .50 mol per cent manganese and exhibiting comparatively little or no luminescence, which comprises subjecting the said composition to a heat treatment at a temperature of from 400° to 600° C. for about 10 to 20 hours in an oxidizing atmosphere.

2. The method of preparing a fluorescent material which comprises heating at an elevated temperature of about 1200° C. a mixture of ingredients which will react to yield a composition consisting essentially of magnesium orthotitanate activated by .001 to .5 mol per cent manganese, and then subjecting the composition to a heat treatment at a temperature of from 400° to 600° C. for about 10 to 20 hours in an oxidizing atmosphere.

3. The method of preparing a luminescent magnesium orthotitanate activated by manganese which comprises firing at an elevated temperature of about 1200° C. a mixture of compounds of the metals magnesium, titanium and manganese of the group consisting of the oxides of said metals and compounds which break down upon heating to yield the oxides of said metals, in proportions to yield a composition consisting essentially of magnesium orthotitanate activated by .001 to .5 mol per cent of manganese, and then subjecting the composition to a heat treatment at a temperature of from 400° C. to 600° C. for about 10 to 20 hours in an oxidizing atmosphere.

4. The process set forth in claim 1 wherein the said oxidizing atmosphere consists of oxygen.

5. The method set forth in claim 3 wherein the said oxidizing atmosphere consists of oxygen.

6. The process set forth in claim 1 wherein the said heat treatment is effected at a temperature of between 500 and 580° C.

7. The method set forth in claim 3 wherein the said heat treatment is effected at a temperature of between 500 and 580° C.

FERDINAND ANNE KRÖGER.
JAN BROOS.

REFERENCES CITED

The following references are of record in the file of this patent:

UNITED STATES PATENTS

| Number | Name | Date |
| --- | --- | --- |
| 2,110,162 | Leverenz | Mar. 8, 1938 |
| 2,244,558 | Krautz | June 3, 1941 |
| 2,298,947 | Leverenz | Oct. 13, 1942 |
| 2,314,699 | Hale | Mar. 23, 1943 |

Certificate of Correction

Patent No. 2,491,865 December 20, 1949

FERDINAND ANNE KRÖGER ET AL.

It is hereby certified that error appears in the printed specification of the above numbered patent requiring correction as follows:

Column 3, line 34, for the word "actuated" read *activated*;

and that the said Letters Patent should be read with this correction therein that the same may conform to the record of the case in the Patent Office.

Signed and sealed this 9th day of May, A. D. 1950.

[SEAL]

THOMAS F. MURPHY,
*Assistant Commissioner of Patents.*